(12) United States Patent
Risner et al.

(10) Patent No.: US 9,759,453 B1
(45) Date of Patent: Sep. 12, 2017

(54) DENSELY PACKED SOLAR CONCENTRATOR STRUCTURE

(71) Applicant: eSolar, Inc., Burbank, CA (US)

(72) Inventors: Jeremy Risner, Pasadena, CA (US); Ulrik Pilegaard, Woodland Hills, CA (US); Herach Ayvazian, Burbank, CA (US)

(73) Assignee: ESOLAR, INC., Burbank, CA (US)

( * ) Notice: Subject to any disclaimer, the term of this patent is extended or adjusted under 35 U.S.C. 154(b) by 666 days.

(21) Appl. No.: 14/139,401

(22) Filed: Dec. 23, 2013

Related U.S. Application Data

(60) Provisional application No. 61/745,451, filed on Dec. 21, 2012.

(51) Int. Cl.
*F24J 2/52* (2006.01)
*F24J 2/54* (2006.01)

(52) U.S. Cl.
CPC ............. *F24J 2/5417* (2013.01); *F24J 2/52* (2013.01)

(58) Field of Classification Search
CPC ............ F24J 2/5417; F24J 2/52; F24J 2/5203
USPC ........................................................ 126/600
See application file for complete search history.

(56) References Cited

U.S. PATENT DOCUMENTS

| | | | | |
|---|---|---|---|---|
| 4,110,009 A | * | 8/1978 | Bunch | F24J 2/16 126/600 |
| 4,913,130 A | * | 4/1990 | Inagaki | F24J 2/02 126/600 |
| 2006/0193066 A1 | * | 8/2006 | Prueitt | F24J 2/10 359/853 |
| 2012/0123720 A1 | * | 5/2012 | Fukuba | F24J 2/40 702/94 |
| 2014/0150845 A1 | * | 6/2014 | Chang | F24J 2/38 136/246 |
| 2015/0292773 A1 | * | 10/2015 | Malan | F24J 2/523 211/41.14 |

* cited by examiner

*Primary Examiner* — Avinash Savani
(74) *Attorney, Agent, or Firm* — Brooks Acordia IP Law, P.C.; Pejman Yedidsion

(57) ABSTRACT

Methods, systems, and devices for a triangular heliostat structure comprising a heliostat drive mounted on a post at each corner of the structure. Embodiments include determining an installation position of a heliostat structure based on the position of an adjacent heliostat structure when a pivotable spacing bar is detachably attached to at least two posts of the heliostat structures and may be based on the heliostat structures comprising three posts in a triangular configuration.

19 Claims, 15 Drawing Sheets

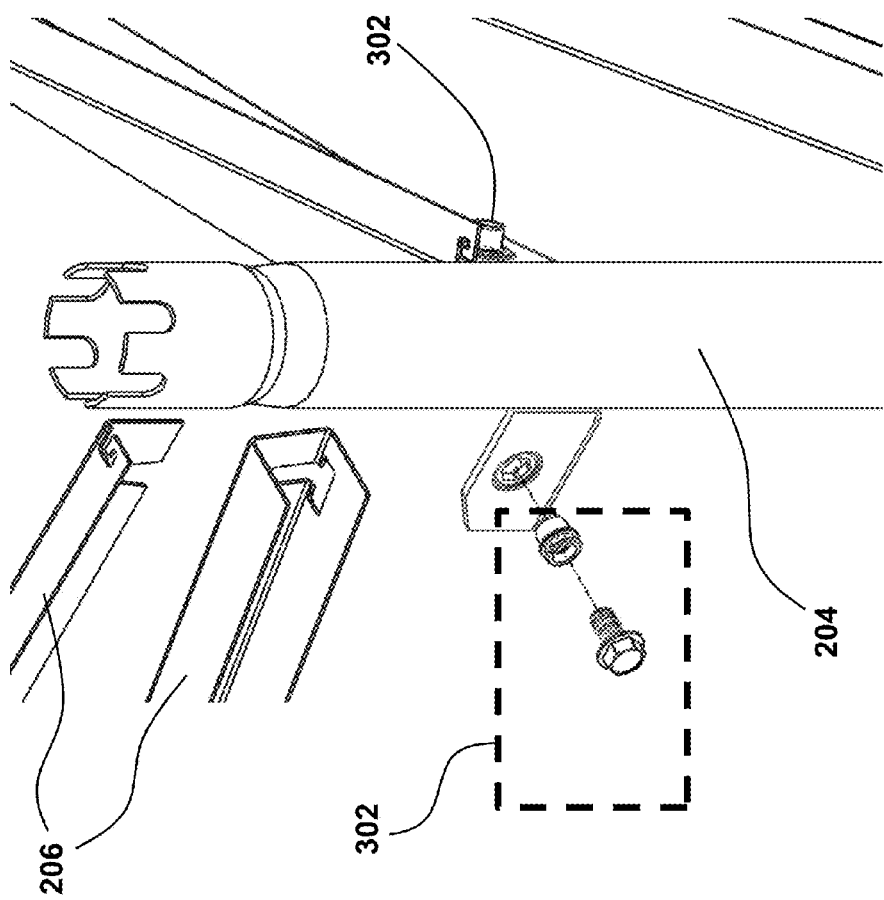

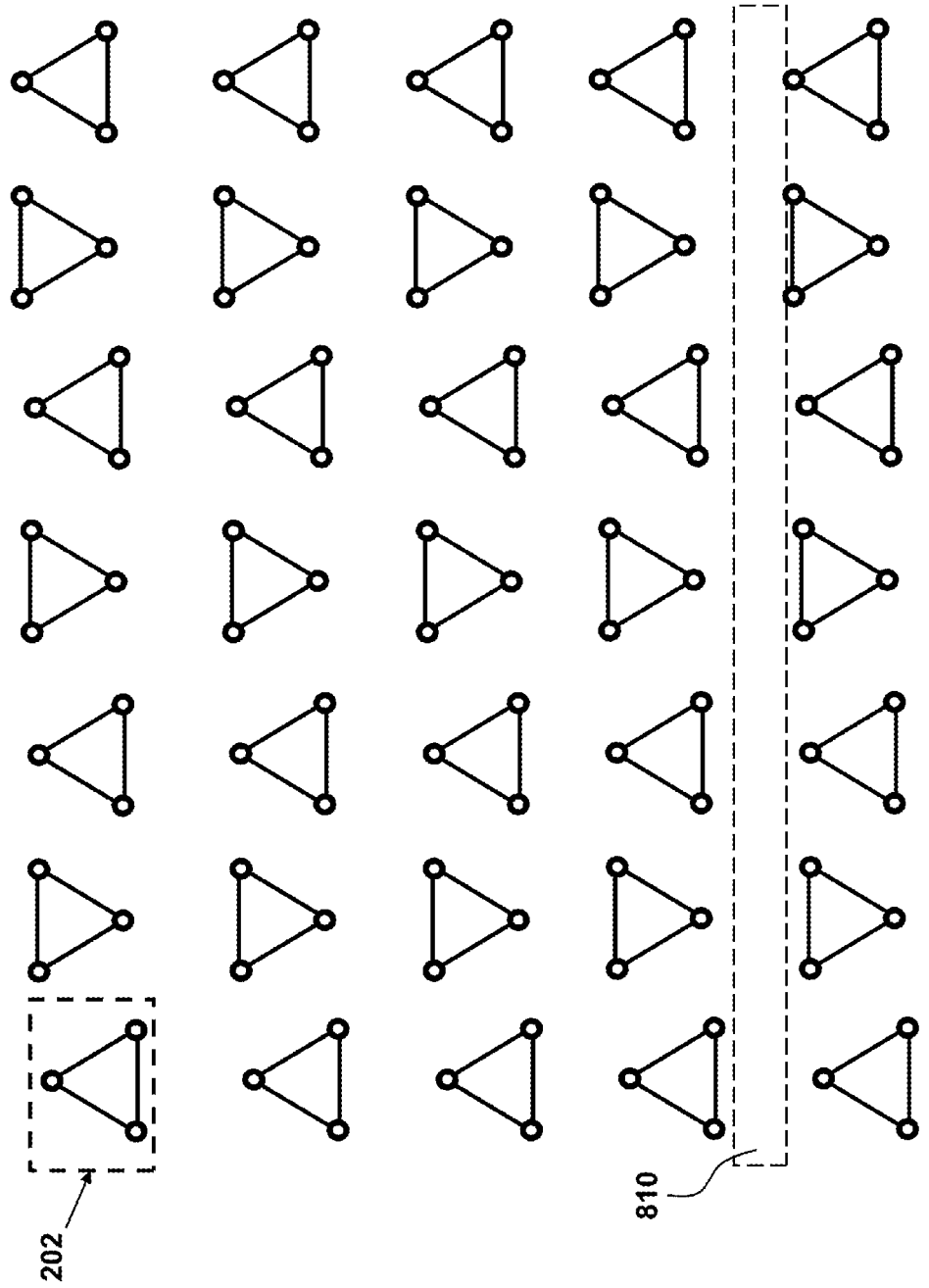

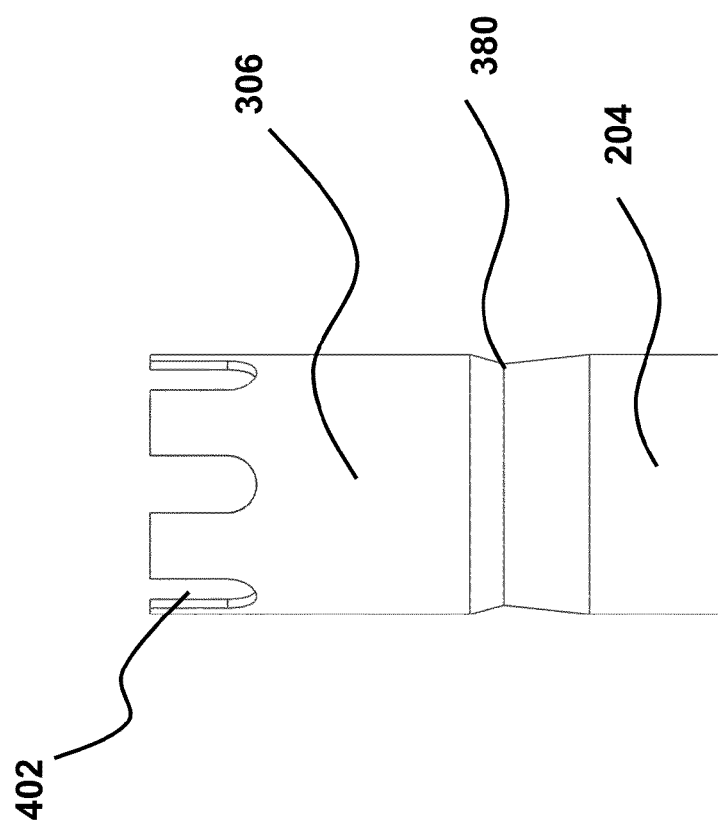

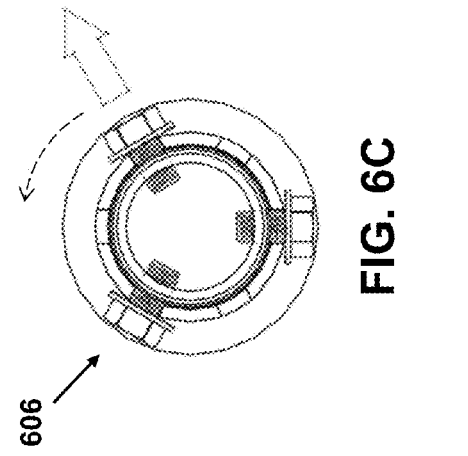
FIG. 6A   FIG. 6B   FIG. 6C
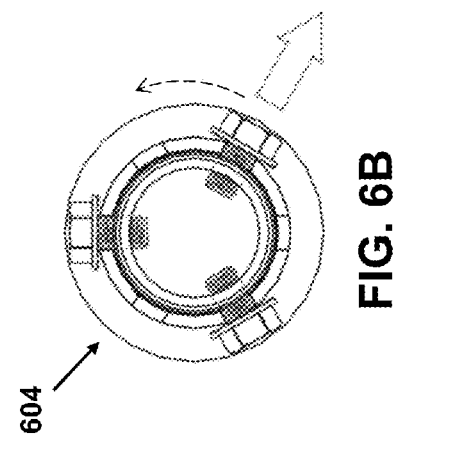
FIG. 6D   FIG. 6E   FIG. 6F
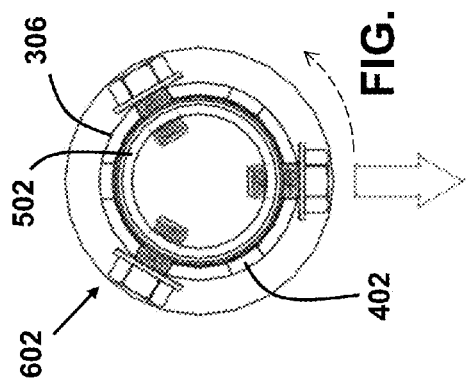
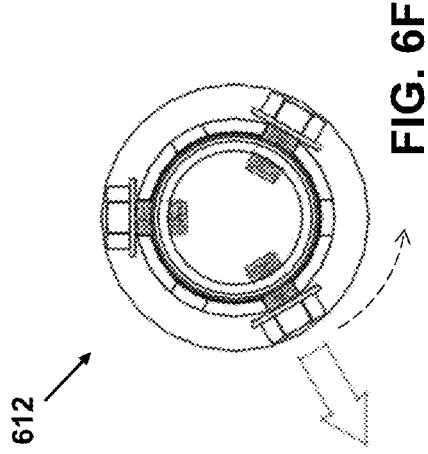
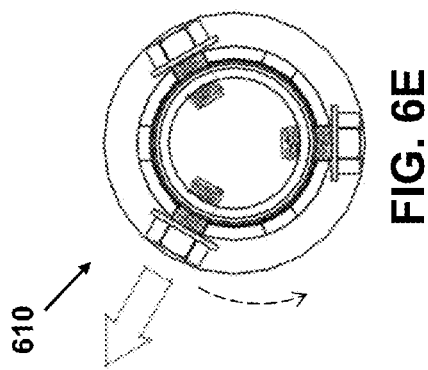
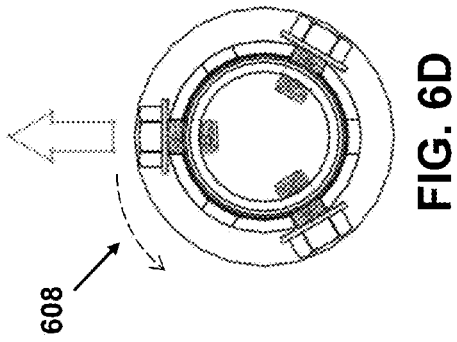

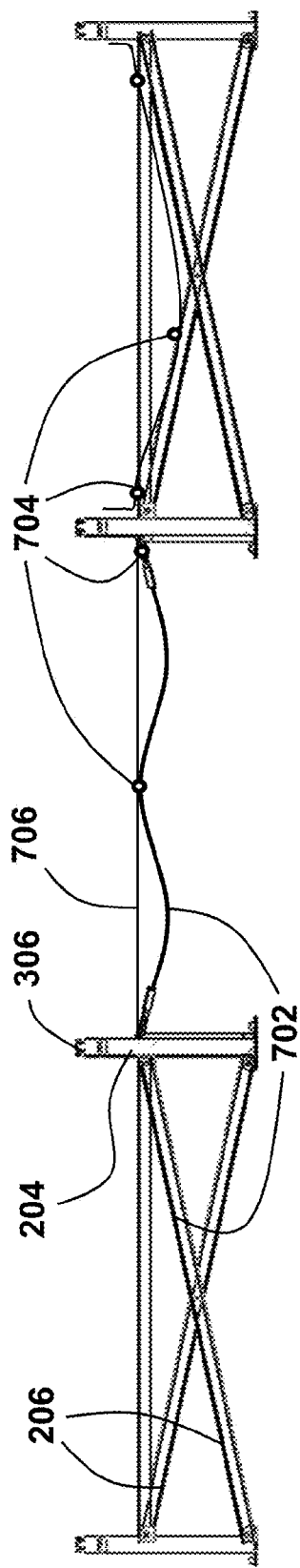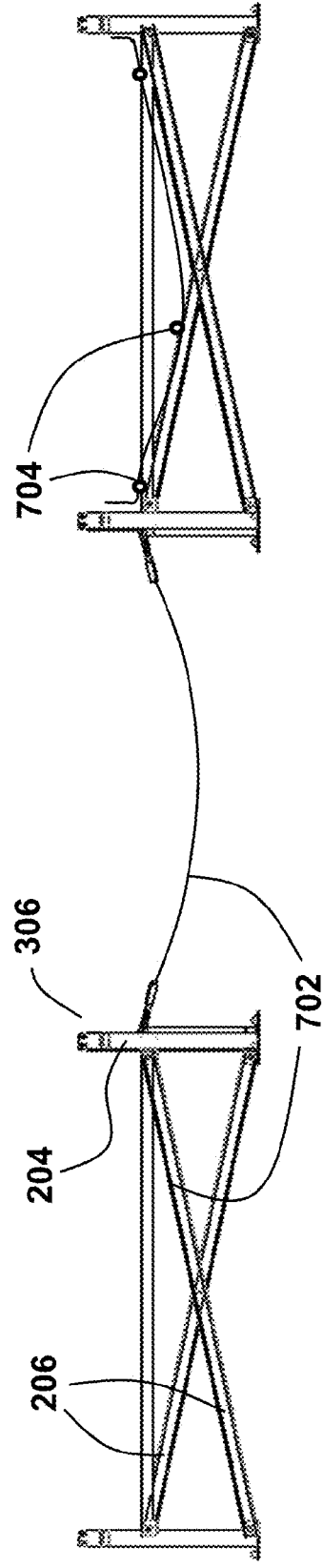

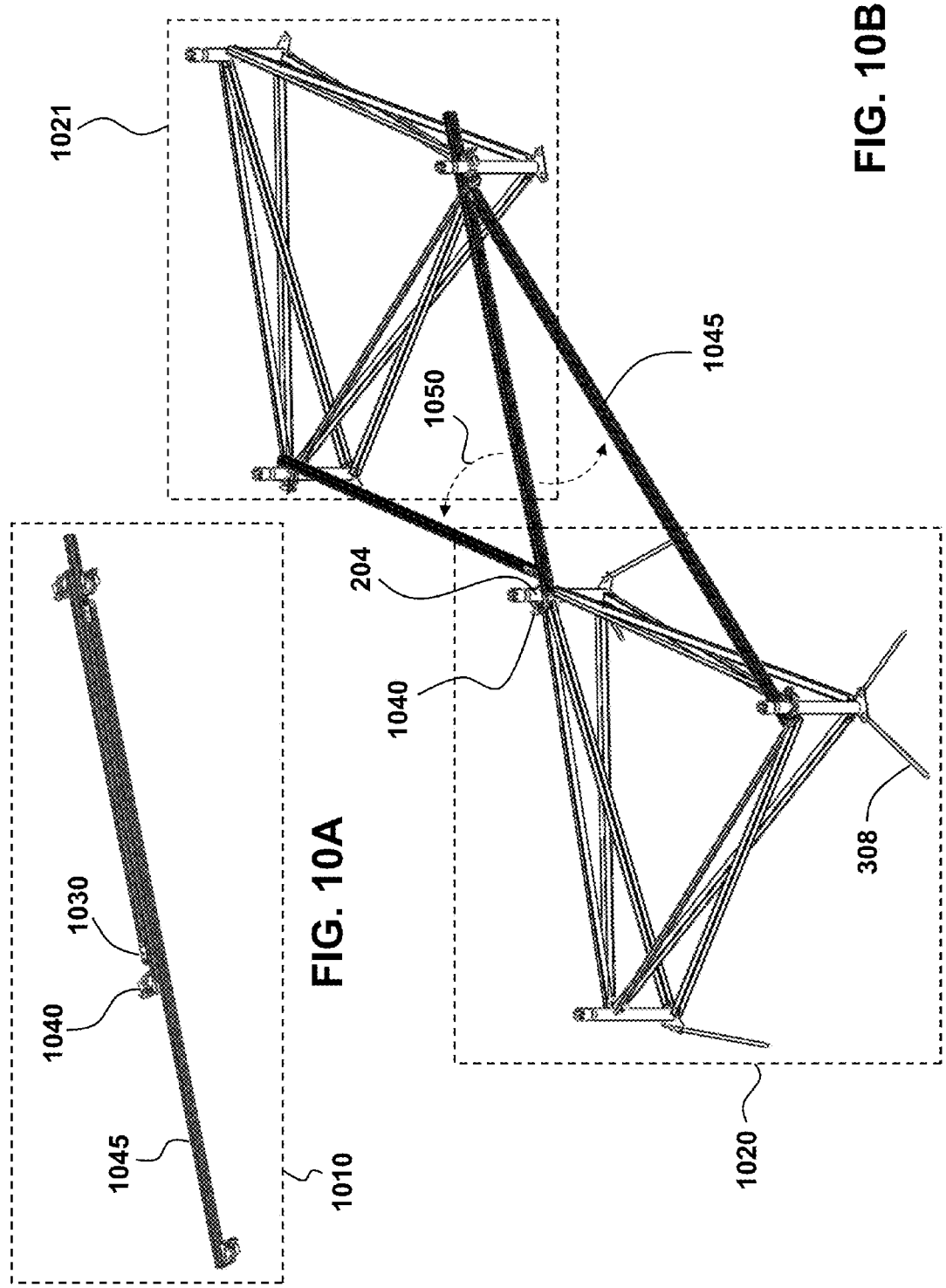

DENSELY PACKED SOLAR CONCENTRATOR STRUCTURE

CROSS-REFERENCE TO RELATED APPLICATIONS

This application claims priority to and the benefit of U.S. Provisional Patent Application Ser. No. 61/745,451, filed Dec. 21, 2012, which is hereby incorporated herein by reference in its entirety for all purposes.

FIELD OF ENDEAVOR

The invention relates to the field of concentrating solar thermal power and more particularly to methods, devices, and systems for heliostat structures.

BACKGROUND

Concentrating solar thermal power plants utilize a large number of heliostats to reflect light onto a central receiver. As such, these heliostats are often a major cost driver in concentrated solar energy plants. Extensive ground preparation, e.g., creating a level surface, may be required prior to placing the heliostats in a field. Further, many heliostats require data and power connections in order to acquire a certain requested orientation. The power connection may provide an energy path to the motors and control boards of the heliostat drive. The data connection may provide communication and controls to the heliostat drive from a central or distributed controller. Existing solar thermal power plants typically utilize large heliostats that are tens to hundreds of square meters in mirror area. These large heliostats require large footings to secure the heliostats in the ground, and each individual footing may need to be surveyed to ensure that the heliostats are placed in a correct location. Additionally, large heliostats require heavy lifting equipment for installation.

SUMMARY

Exemplary heliostat structures may comprise: three posts; three drive mounts, where each drive mount may be located at an end portion of each of the three posts; three or more cross members, where each cross member of the three or more cross members may be connected between two posts and may form a triangular structure; and three heliostat drives, where each heliostat drive may be configured to connect to a corresponding drive mount located on the end portion of the post. In one embodiment, each post may be equidistant from each other post, and the three cross members may form an equilateral triangle with the posts. Additionally, each cross member may be interchangeable with each other cross member. In one embodiment, the heliostat structure may further comprise six cross members, where each two cross members may connect between two posts to form a triangular structure, and where each two cross members may intersect at a point between the two posts.

In some embodiments, the heliostat structure may further comprise nine cross members, where each three cross members may connect between two posts to form a triangular structure, and where two of each three cross members may intersect at a point between the two posts. In another embodiment, the heliostat structure may further comprise one or more stakes, where the one or more stakes may be disposed in the ground and attached to a proximate portion of one or more of the three posts. Additionally, the three heliostat drives may be integral with the three posts and the three heliostat drives may be detachably attached to the three posts.

In some embodiments, the heliostat structure may further comprise a processor having addressable memory, where the processor may be configured to: calibrate the position of the heliostat structure against a known surface based on three points of contact of the three heliostat posts to the ground. In other embodiments, the heliostat structure may further comprise three heliostats, where the three heliostats may be positioned on each of the three drive mounts, and where the arrangement of the three heliostats may produce a hexagonal packing and the heliostat density may range from 20% to 50%. In one embodiment, the three drive mounts may each comprise six or more slots, where the three heliostat drives comprise three or more fasteners, and where the six or more slots of the drive mounts may be configured to receive the three or more fasteners of the heliostat drives so as to provide six orientations for mounting each heliostat drive in each drive mount. In addition, each of the three drive mounts may further comprises a tapered region, where the tapered region may create two separate contact regions between each drive mount and each connected heliostat drive and a wire, where the wire may be configured to connect to an adjacent heliostat structure. Optionally, the wire may be configured to provide a set spacing between the heliostat structure and an adjacent heliostat structure.

In some embodiments, the heliostat structure may further comprise a foldable jig, where the foldable jig may further comprise one or more spacing bars and one or more interface points, where the one or more interface points may be configured to detachably attach to one or more posts of the heliostat structure and one or more posts of an adjacent heliostat structure. Additionally, the foldable jig may be configured to detachably attach to an adjacent heliostat structure in an adjacent row of heliostats and the foldable jig may be configured to detachably attach to an adjacent heliostat structure in an adjacent column of heliostats. Optionally, the one or more interface points may be selected from at least one of: a pin and a clamp.

Another exemplary method may comprise: detecting a position of a fixed heliostat structure in a solar field, where the detected fixed heliostat structure may comprise three posts in a triangular configuration, and where the detected fixed heliostat structure is anchored to the ground; locating a pivotable spacing bar between the detected fixed heliostat structure and an adjacent heliostat structure, where the adjacent heliostat structure may comprise three posts in a triangular configuration; determining an installation position of the adjacent heliostat structure, where the determined installation position may be based on the position of the adjacent heliostat structure when the pivotable spacing bar is detachably attached to at least two posts of the detected fixed heliostat structure and detachably attached to at least two posts of the adjacent heliostat structure.

Other exemplary embodiments may include a heliostat triangle structure system comprising a heliostat drive mounted at each corner of the structure. In additional exemplary embodiments, each heliostat may be connected to each other by field wiring. Field wiring may provide inputs and outputs to each heliostats such as electricity, data, and system status. In additional exemplary embodiments, the corners may be connected by cross-members. In additional exemplary embodiments, the cross-members may be the same length. In additional exemplary embodiments, the cross members may be varied in length. Exemplary embodiments may also include a heliostat structure that mounts a heliostat on each corner; and may be connected by field wiring from one heliostat structure to the next. In additional exemplary embodiments, the field wiring may be fastened to heliostat structure by means to hold the wiring to the structure.

Exemplary embodiments may also include a heliostat structure comprising: three posts, where each post is equidistant from each other post; three drive mounts, where each drive mount is located at an end portion of each of the three posts; three cross members, where each cross member is connected between two posts to form an equilateral triangle structure; and three heliostat drives, where each heliostat drive is connected to a corresponding drive mount located on the end portion of the post. Exemplary embodiments may also include a drive post, where the drive post comprises a tapered end configured to contact a drive mount at two separate contact regions; and one or more fasteners, where the one or more fasteners are configured to align with one or more slots of the drive mount.

BRIEF DESCRIPTION OF DRAWINGS

Embodiments are illustrated by way of example and not limitation in the figures of the accompanying drawings, in which:

FIG. 3B depicts a perspective view of a heliostat structure prior to assembly;

FIG. 3C depicts an overhead view of a heliostat field;

FIG. 4 depicts a perspective view of an exemplary drive mount attached to a post;

FIGS. 6A-6F depict a series of orientations of the drive in an exemplary drive mount;

FIG. 7A depicts a side view of two exemplary adjacent heliostat structures with a wire support between structures;

FIG. 7B depicts a side view of two exemplary adjacent heliostat structures without a wire support between structures;

FIG. 10A depicts a collapsible heliostat positioning jig;

FIG. 10B depicts a fixed heliostat structure being used to position a heliostat in an adjacent column;

DETAILED DESCRIPTION

Figure 1:
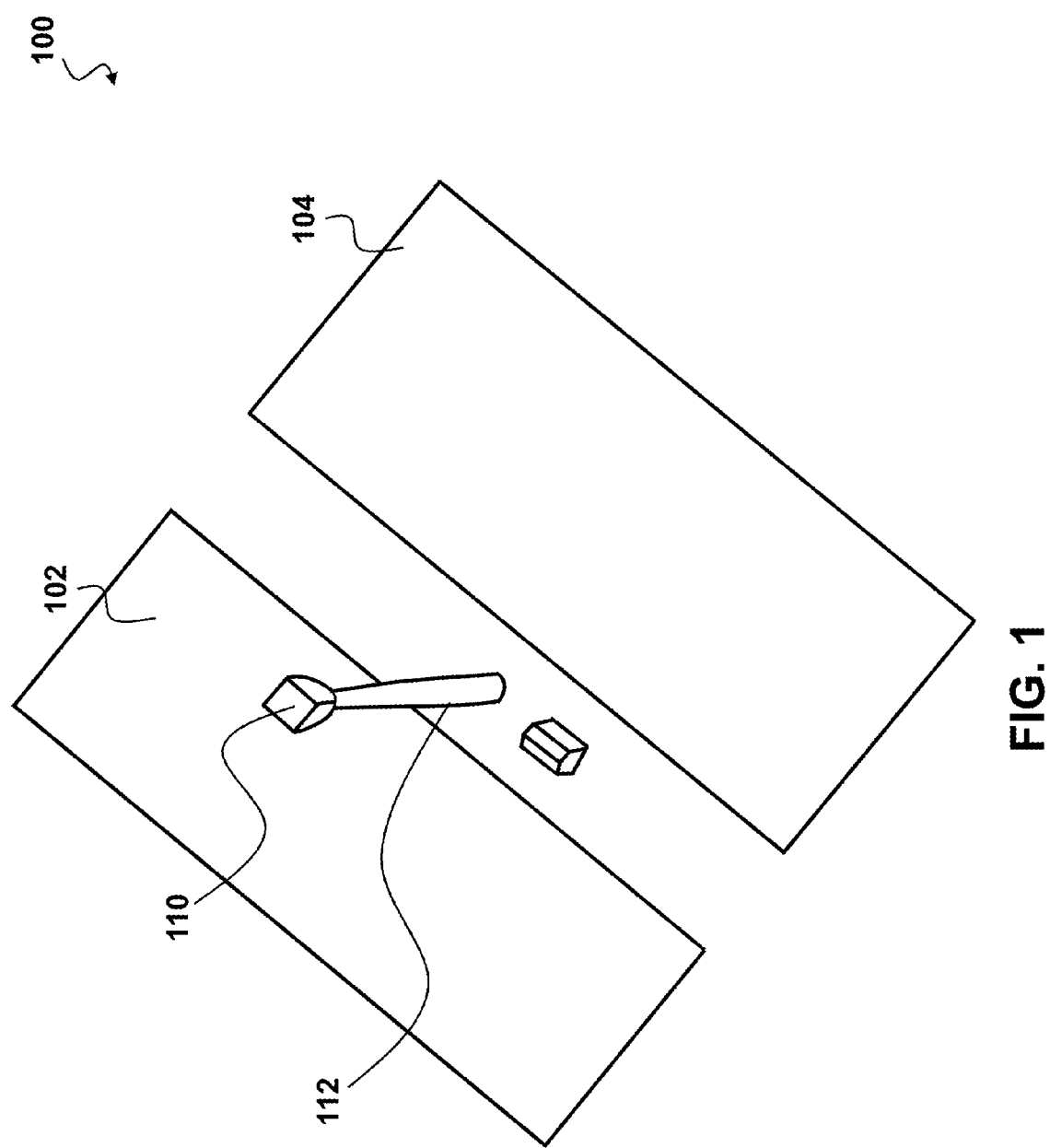
FIG. 1 depicts a perspective view of an exemplary solar thermal receiver positioned between two heliostat arrays in a solar power plant system.

FIG. 1 depicts a perspective view of an exemplary solar power plant 100 comprising a solar thermal receiver 110 positioned between two heliostat arrays 102,104. The solar thermal receiver 110 may be positioned between a first heliostat array 102 and a second heliostat array 104. An exemplary solar power plant 100 may comprise one or more solar thermal receivers 110, with one or more corresponding heliostat arrays 102,104 reflecting incident Sunlight to a corresponding solar thermal receiver 110 that may be mounted on a tower 112.

Figure 2:
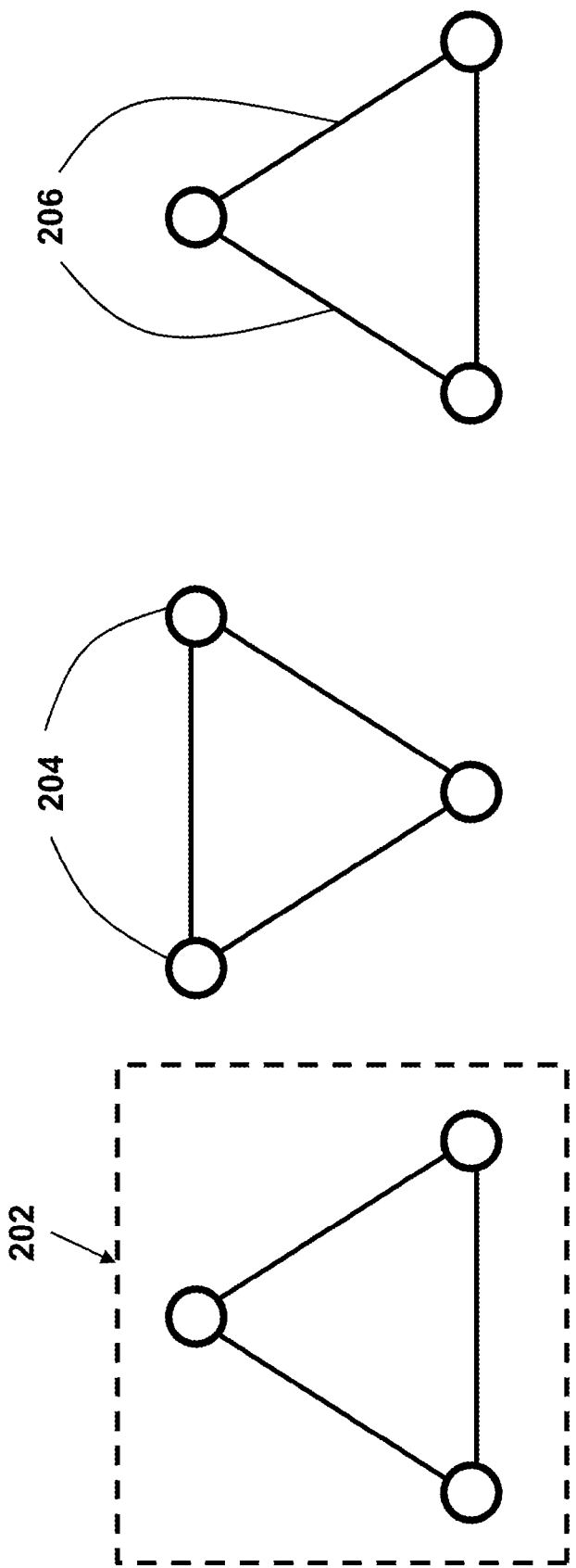
FIG. 2 depicts a top view of an exemplary row of heliostat structures.

FIG. 2 depicts a top view of an exemplary row of heliostat structures 202. Each heliostat array in a solar power plant may comprise one or more rows of heliostat structures 202. Using repeating heliostat structures 202 may reduce the cost and/or installation time required to set up each heliostat array. Each heliostat structure 202 may comprise three posts 204 connected by at least three cross members 206, such that each post 204 is connected to every other post 204 in the heliostat structure 202 by at least one cross member 206.

An alternative to existing large heliostat embodiments is the small heliostat embodiment disclosed herein. Small heliostats may be installed by workers with simple hand tools rather than large, unwieldy, and expensive equipment. These small heliostats may be secured by stakes instead of the poured foundations that may be required in larger heliostat embodiments. These advantages may lower the installation time, cost, and/or difficulty of the system. Additionally, small heliostats may be arranged in groups, e.g., rows of heliostat structures 202. These heliostat structures 202 may provide self-leveling features, which may minimize the amount of surveying needed during installation.

A system utilizing heliostat triangle structures of small heliostats may enable a self-leveling heliostat grouping. If the structure is an equilateral triangle, unique part numbers are significantly reduced and installation simplified due to each heliostat structure needing three identical parts for each side of the triangle structure, rather than a mix of unique parts. The triangle structure may also allow for a hexagonal close packing configuration of heliostats, which may yield a high packing density and leave regular gaps in mirror areas that may be used to position lightning rods or other field equipment. A triangle structure also allows for two rows of heliostats to be mounted adjacent to one another with a heliostat structure 202 in between them. In some embodiments, an unobstructed row in between adjacent rows of heliostat structures 202 may be used for cleaning, maintenance, and general access.

Figure 3A:
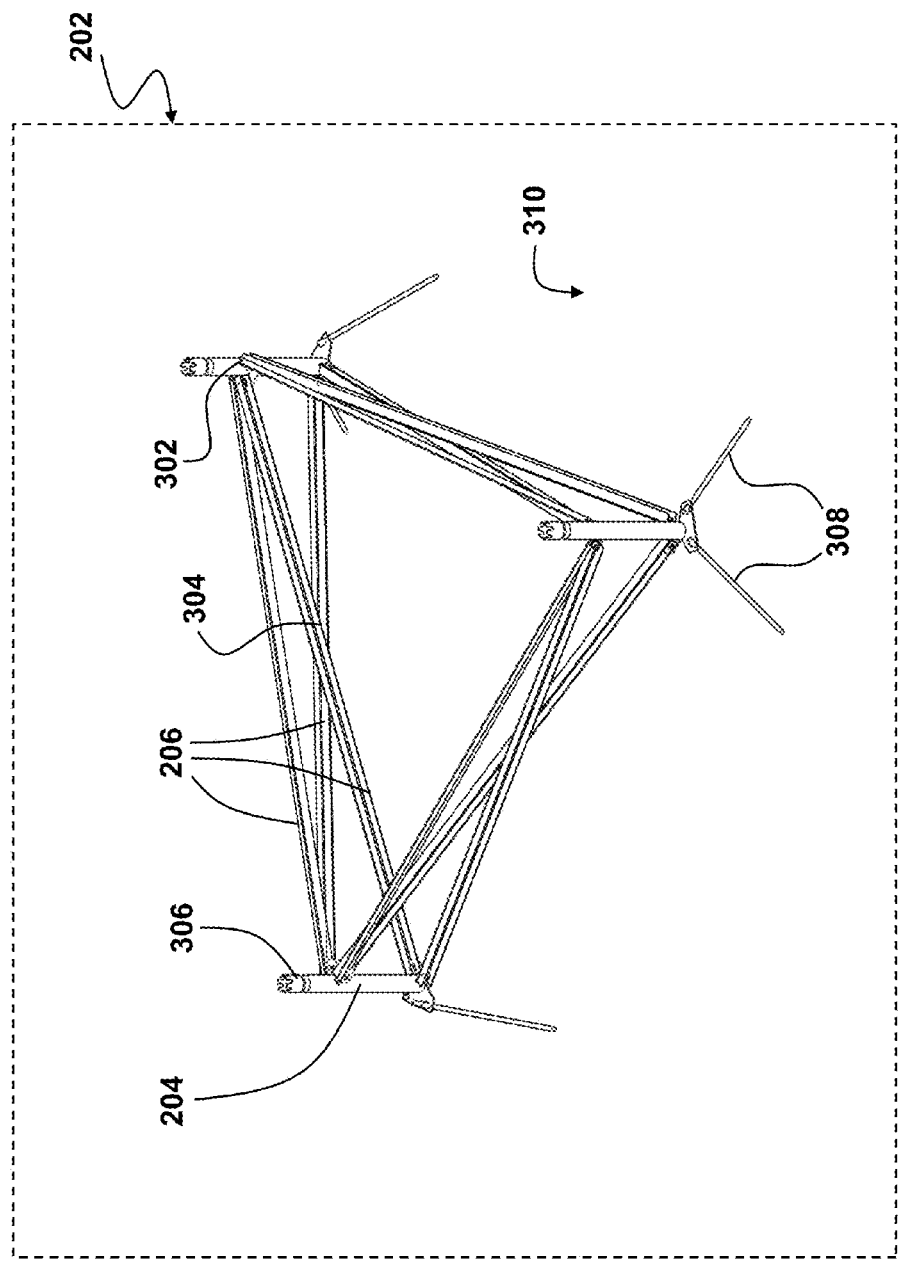
FIG. 3A depicts a perspective view of an exemplary heliostat structure.

FIG. 3A depicts a perspective view of an exemplary heliostat structure 202. The heliostat structure 202 may comprise three posts 204 and three sets of one or more cross members 206. The three post design of the heliostat structure 202 may allow for consistent contact with the ground without the need for ground penetration, as may be necessary in a single post layout. This heliostat structure 202 may not necessitate digging holes and/or pouring concrete to form foundations. Each post 204 may be connected to every other post 204 in the heliostat structure 202 by a set of one or more cross members 206. The cross members 206 may be attached to each post 204 with a fastener 302. If two or more cross members 206 are used in between each post 204, the cross members 206 may be connected by a fastener 304 at one or more locations along the length of the cross members 206, e.g., at a point where they intersect. The cross members 206 may be comprised of one or more materials, e.g., wood, metal, and plastic. Additional cross members 206 may be added to provide further support to the heliostat structure 202. These additional cross members 206 may be connected to each other along the span between the two posts 204 at one or more points (not shown). In some embodiments, a single cross member 206 may be used in between each post 204 (not shown). This single cross member 206 may be a tube or a channel depending on the stiffness requirements. A triangular shaped heliostat structure 202 provides a structure that may be more rigid and stiffer than other structure shapes, such as, e.g., a square, pentagon, or other polygons.

A drive mount 306 may be located at the top of one or more posts 204 of the heliostat structure 202. The drive mount 306 may be integral to the post. In other exemplary embodiments, the drive mount 306 may be a separate part that may be attached to the post 204 during assembly of the heliostat structure 202, i.e., detachably attached.

One or more stakes 308 may be placed at a bottom portion of each post 204 to anchor the heliostat structure 202 to the ground 310. In some embodiments, the heliostat structure 202 may be anchored to the ground 310 by one or more devices, e.g., stakes 308, adhesives, and/or weights, e.g., a ballast. The length of the stakes 308 may be varied depending on soil conditions and environmental factors such as wind speed. A stake with the length of 0.5 meters or longer may be adequate in most soil conditions. Stake 308 lengths shorter than 0.5 meters may not provide an adequate holding ability for the heliostat structure. An optimum angle of the stakes 308 is approximately 45 degrees, with each stake inserted in opposing orientations.

The triangle arrangement of the heliostat structure 202 may allow the heliostat structure 202 to remain in contact with the ground 310 on irregular surfaces without the need for adjustments to the height of each post 204 and/or extensive ground preparation. The triangle arrangement of the heliostat structure 202 may also ensure that the posts 204 of the heliostat structure 202 remain in contact with the ground 310 in the event of soil movement. The three points of contact of the heliostat structure 202 determine the surface and may allow for any heliostat mounted on the heliostat structure 202 to be calibrated against a known surface. Heliostats may be calibrated again at later points in time to mitigate any later errors introduced by the system shifting or settling into the ground 310. In some embodiments, the posts 204 may be designed to apply acceptable ground pressures. The allowable ground variation that the heliostat structure 202 can be deployed upon may depend on the ability to calibrate the heliostat, the amount of performance loss tolerated due to a restricted range of motion, and/or the tolerated field efficiency loss. Each heliostat may be individually calibrated, and once the full heliostat field calibration is completed, a random selection of heliostats may be selected for on-line calibration. Re-calibration of heliostats may occur on a regularly planned schedule, e.g., a six-month cycle. The equilateral triangle structure of this exemplary heliostat structure 202 embodiment, utilizing cross members 206 of a uniform length, may be used to produce a hexagonal packed heliostat field layout. Hexagonal packing provides an efficient field packing arrangement for a constant density heliostat field by maximizing the amount of mirror area on a given area of land. The number of unique parts used, i.e., the part counts, in this system may be reduced, because each cross member 206 of the pair of cross members 206 is the same size and type. Additionally, a single type of post 204 may be used for each post 204 in the heliostat structure 202 to reduce the part count. In some embodiments, parts may have a fastener integral with the part to reduce field assembly time and/or the amount of tooling required during installation. In embodiments where a different field density is desired, the cross members 206 may be lengthened or shortened to change the heliostat field density. The length of one or more of the cross members may be changed to create local heliostat density changes. Such a change may require accommodations at the fastener 302, where the cross member 206 attaches to the post 204. This change may also change installation angles. In embodiments with an equilateral triangle, the angles are sixty degrees. Lengthening or shortening the cross members 206 allows for the 2-D heliostat density to be customized based on certain requirements. In a fixed density heliostat field, the density of heliostats may range from 20% to almost 50%. Heliostat density is defined as the mirror area of installed heliostats in a heliostat field over the total area of the heliostat field.

FIG. 3B depicts a perspective view of a heliostat structure prior to assembly. A fastener 302 may be used to attach one or more cross members 206 to each post 204. Each cross member 206 may be connected to each post 204 by at least one fastener 302. In some embodiments, two or more cross members 206 may be connected to a post 204 at a single combined fastener 302.

FIG. 3C depicts an overhead view of a heliostat field. The triangle heliostat structures 202 may be arranged in a hexagonal close packed configuration. One or more service pathways 810 may be formed by this arrangement that may allow for maintenance and operation activities to be performed on the heliostat field.

FIG. 4 depicts a perspective view of an exemplary drive mount 306 attached to a post 204. The drive mount 306 may have several slots 402 to allow for placement of a heliostat drive in the slots 402. In one exemplary embodiment, the drive mount 306 has six slots 402 to allow for placement at one of six orientations (See FIGS. 6A-6F). In other embodiments, there may be more slots or fewer slots based on the requirements of the solar power plant. The drive mount 306 may be integral to the post 204 or a separate part that may be placed on top of the post 204. In some embodiments, the post 204 may have two or more diameters or wall thicknesses to accommodate a drive assembly. In other embodiments, the post may have a tapered area 380 to assist in increasing contact area with a placed heliostat drive.

Figure 5B:
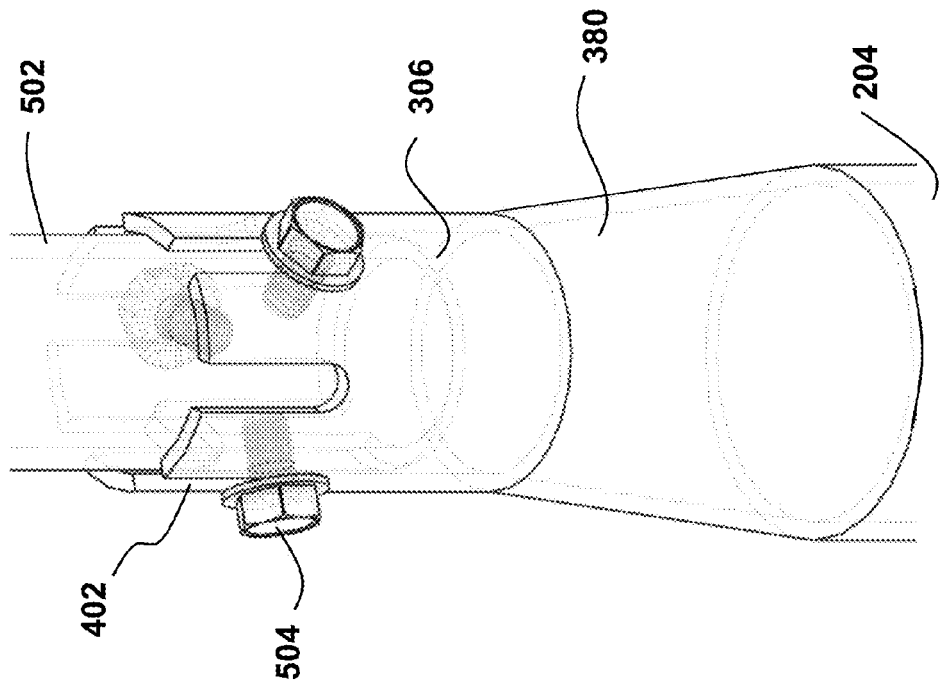
FIGS. 5A-5C depict an exemplary drive post inserted into an exemplary drive mount.
Figure 5A:
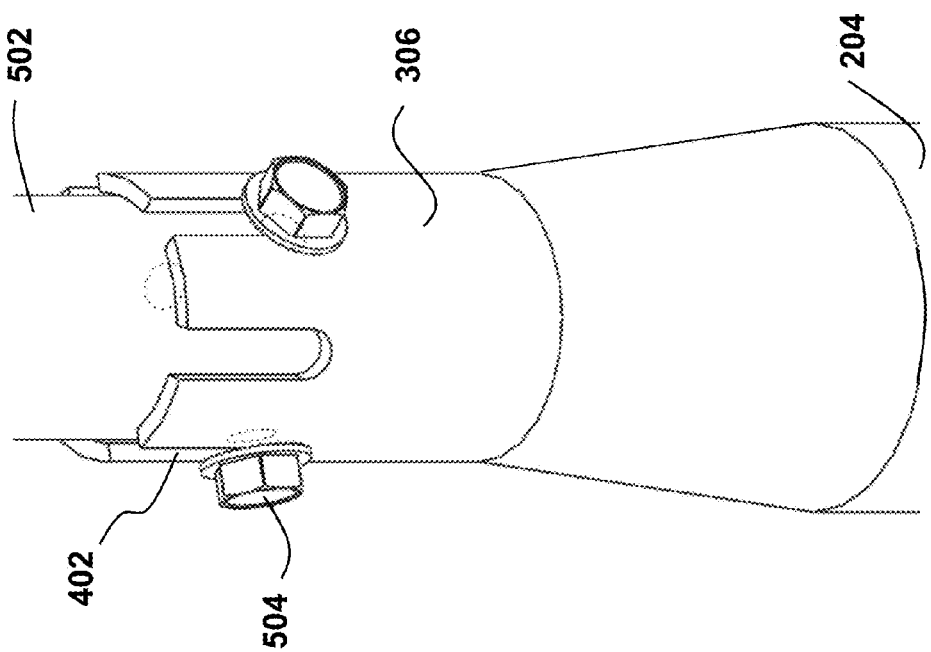
Figure 5C:
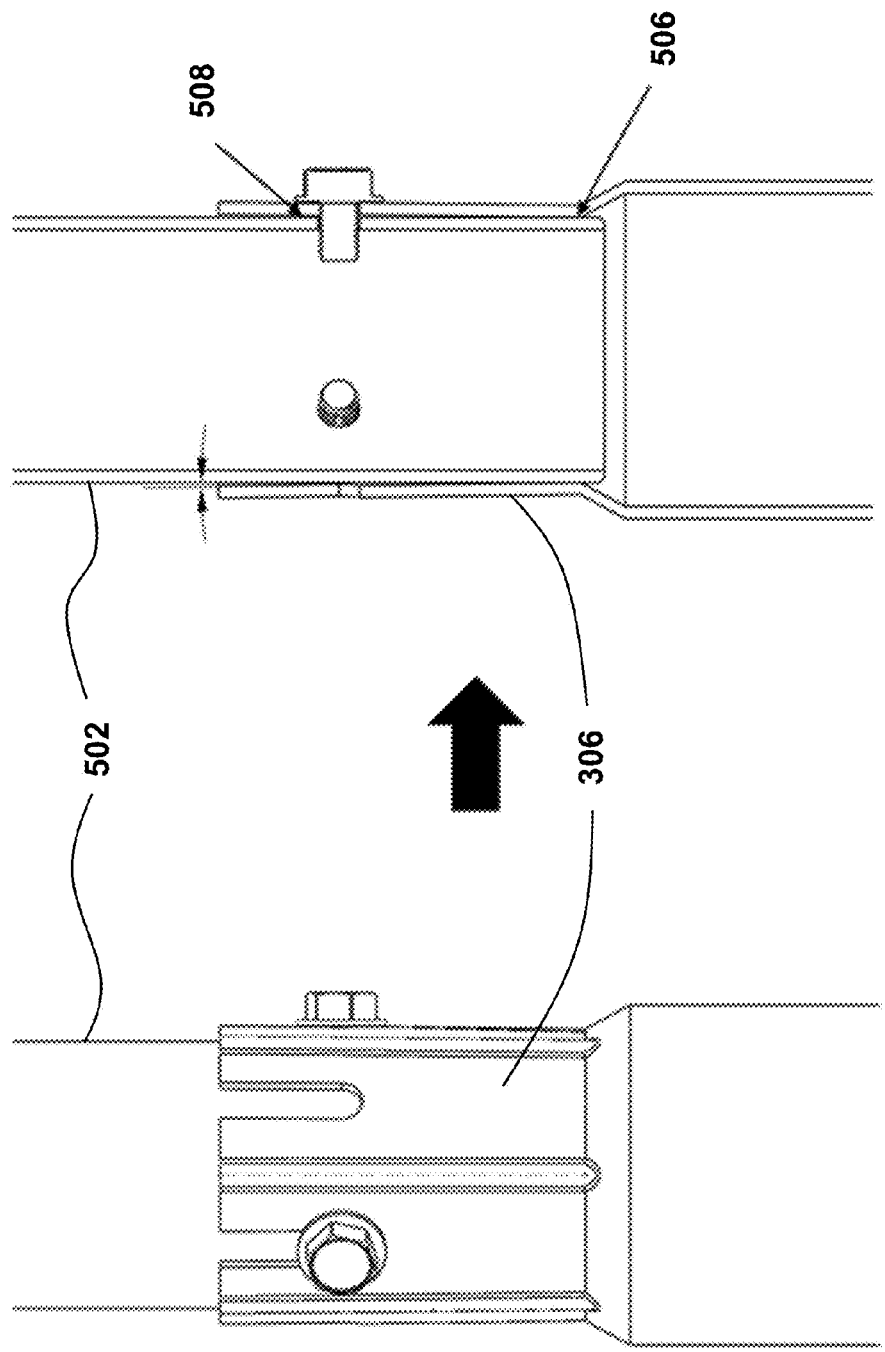

FIGS. 5A-5C depict an exemplary drive post 502 inserted into an exemplary drive mount 306. The post 204 is shown with an attached drive mount 306. A drive post 502 is inserted into the drive mount 306 and held in place by one or more fasteners 504. The drive post 502 may be connected to a heliostat drive. Slots 402 in the drive mount 306 allow for the one or more fasteners 504 to secure the drive post 502 in place. These fasteners 504 may be screws, bolts, and/or fastening members included on the drive post 502 and/or the drive mount 306. The fasteners 504 may come preinstalled in the drive post 502 and may aid in aligning the drive post 502 to the drive mount 306 via the slots 402. A tapered region 380 may be included to create two separate contact regions 506, 508 between the drive post 502 and the drive mount 306. The tapered region may be created using swaging, crimping, casting, or other mechanical forming methods. The first contact region 506 and the second contact region 508 increase the joint, i.e., interface, stiffness. There may be approximately one degree difference between the angle of the drive post 502 and the drive mount 306.

FIGS. 6A-6F depict a series of orientations of the drive post 502 in an exemplary drive mount 306. Position 1 602 is a nominal installation. Position 2 604 allows the drive post 502 to be positioned 60 degrees counterclockwise from position 1 602. Position 3 606 is 120 degrees counterclockwise from position 1 602. Position 4 608 is 180 degrees from position 1 602. Position 5 610 is 120 degrees clockwise from position 1 602. Position 6 612 is 60 degrees clockwise from position 1 602. Additional slots 402 may be used in some embodiments to provide additional positions, if needed.

Fewer slots 402 may also be used to provide fewer positions. A six slot configuration, as shown, allows for a single type of drive mount 306 to be used, in any position, in a plurality of configurations around a solar thermal receiver. Having six opposed slots 402 on the top of each post allows for the heliostats to be orientated in any of the six positions 602, 604,606,608,610,612. This embodiment allows for repeatability in the orientation of the heliostat structures in each row as well as repeatability of installation steps. The six slot 402 configuration may also eliminate the need to orientate the drive mount 306 with respect to a certain direction. The three drive mounts 306 in a triangle heliostat structure may self-align with the disclosed six slot 402 configuration.

FIG. 7A depicts a side view of two exemplary adjacent heliostat structures. Each post 204 may be attached by cross members 206 to adjacent posts 204 in the same heliostat structure. The drive mount 306 located on the top portion of each post 204 may have cables 702 run to and from the drive mount 306. One or more fasteners 704 may be attached to posts 204, cross members 206, and/or drive mounts 306 in order to reduce the movement of the cabling 702. Fasteners 704 may be, for example, twist ties, clamps, clips, wires, and/or adhesives. These fasteners 704 may help to minimize the movement of the cable in the wind, and may also act as a strain relief by keeping the cable close to the heliostat structure. A wire 706 or other means of support may be used between adjacent heliostat structures to provide a means for elevating the cable 702. The cable 702 may also be attached to the wire 706 by a fastener 704. In some embodiments, the cables 702 may be partially or completely included in the heliostat structures. In other embodiments, the cables 702 may be used as a jig during installation by providing a set spacing between adjacent heliostat structures. These cables 702 may be installed at an offsite location or onsite at the solar power plant.

FIG. 7B depicts a side view of two exemplary adjacent heliostat structures without a support wire between the structures. Two cables 702 may be included with each heliostat drive to connect two or more heliostats together. Each cable 702 may have a connector at an end portion. These cables 702 may transmit power and/or data to the heliostats in the heliostat field. In some embodiments, there may be a long cable and a short cable on each heliostat drive. The long cable may be long enough to reach the adjacent heliostat drive and attach to that heliostat drive's short cable. These cables 702, and corresponding cable connectors, may be coated with a material to enhance their lifetime, e.g., a UV coating, and may be made of plastics, metals, and/or other materials that may delay or prevent cable degradation. When connecting cables 702 from heliostat to heliostat, the wire may be left to hang between structural members (See FIG. 7B), or it may have a means of support (See FIG. 7A), e.g., a wire, a rigid member, a flexible member, a slot, or an enclosed tube. Any such support may be used to provide strain relief when the cable 702 is run from one heliostat structure to another heliostat structure. This arrangement keeps the cable 702 raised off the ground and may provide strain relief for any connectors. The support may be made of a variety of materials, including, but not limited to, metal, plastic, composites, and/or string. In some embodiments, cables 702 may be run along the outside of the surface of the heliostat structures. In other embodiments, cables may be run within the internal surfaces of the heliostat structures. Cables 702 may be connected in a variety of configurations. In some embodiments, heliostat drives may have their connectors run in a single row that may loop back at the end of the row and may lead into an adjacent row of heliostats. In other embodiments, heliostats may be connected on each structure, and then each structure may be connected to an adjacent structure.

Figure 8:
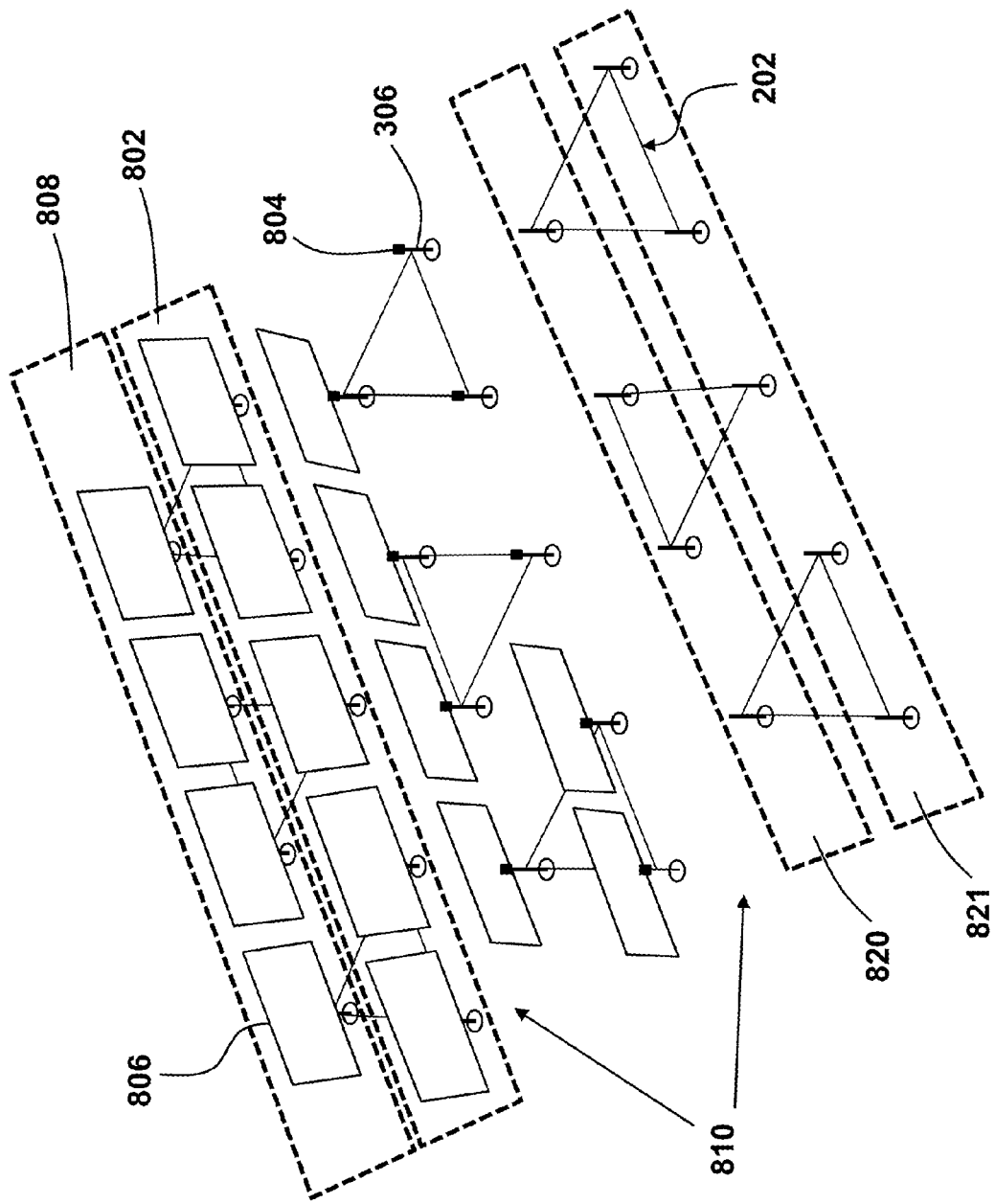
FIG. 8 depicts a perspective view of heliostat structures installed in a solar field.

FIG. 8 depicts a perspective view of heliostat structures installed in a solar field. A number of heliostat structures 202 may be placed in a partially installed heliostat row 802. Each Heliostat structure 202 may have a heliostat drive 804 placed on each drive mount 306. Heliostats 806 may be controlled by a heliostat drive 804 comprising a one or more axis tracker that tracks the Sun and reflects Sunlight to be focused on a target, e.g., a solar thermal receiver. A heliostat 806 may be attached to each heliostat drive 804 as part of a fully installed heliostat row 808. A service pathway 810 between the heliostat rows may allow for access to the heliostat structures when the heliostat drives 804 orient their respective heliostats 806 into a service position, e.g., a substantially vertical position to allow for access by service vehicles and/or personnel. Heliostat rows 820, 821 show the heliostat structure without the heliostats installed.

Figure 9B:
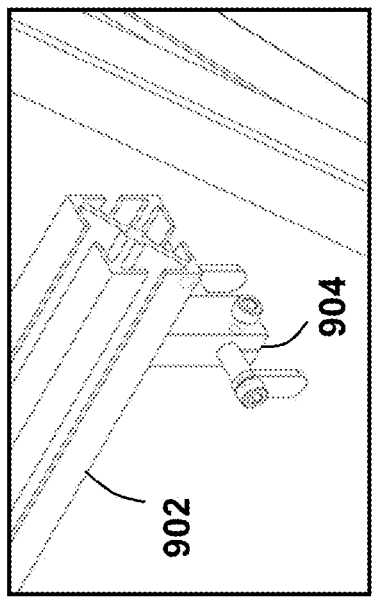
FIG. 9B depicts an end portion of an exemplary spacing bar having a pin structure.
Figure 9C:
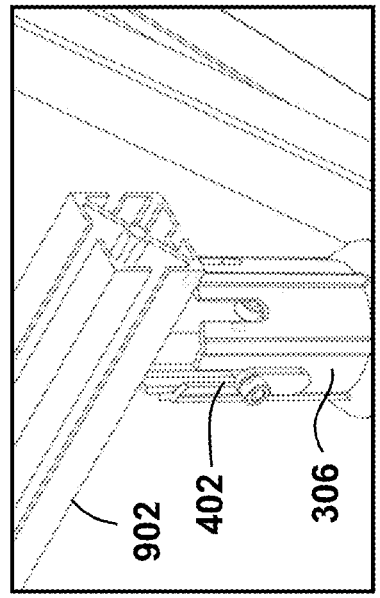
FIG. 9C depicts an end portion of an exemplary spacing bar engaged to a drive mount.
Figure 9A:
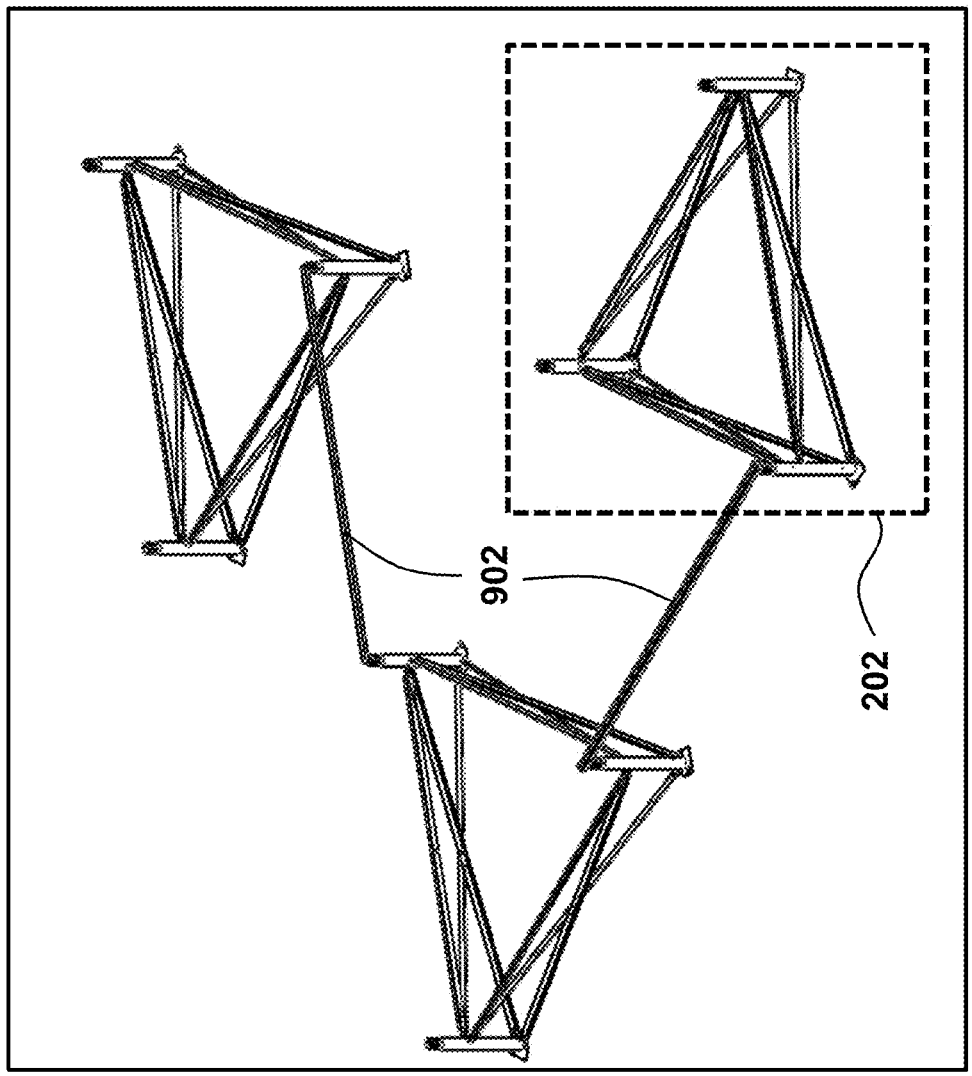
FIG. 9A depicts an exemplary spacing bar between heliostat structures.

FIG. 9A depicts an exemplary spacing bar 902 between heliostat structures 202. The spacing bar 902 may be used to aid in the placement of heliostat structures 202 in a heliostat array. FIG. 9B depicts an end portion of the exemplary spacing bar 902 comprising a pin structure 904. The pin structure 904 may be placed in a slot of the drive mount 306 (See FIG. 9C) to determine the placement of an adjacent heliostat structure.

FIG. 9C depicts an end portion of an exemplary spacing bar 902 engaged to a drive mount 306. The slots 402 in the drive mount 306 may be used as an installation reference point off of a previously installed heliostat structure. The spacing bar 902 may be used to determine proper spacing and positioning of the triangle heliostat structures 202 in a heliostat field. The spacing bar 902 may be removed and reused on adjacent heliostat structures 202 during installation to ensure proper spacing of heliostat structures 202 during the installation of the heliostat structures in a heliostat field.

FIG. 10A depicts a foldable jig 1010 that may be used to position heliostats from a fixed heliostat structure 1020. The foldable jig 1010 has pivot points 1030 to allow the device to interface with heliostat structures being installed. The foldable jig 1010 may also have interface points 1040 where the foldable jig 1010 interacts with fixed, installed heliostat structures and/or uninstalled heliostat structures. One or more spacing bars 1045 may be used to ensure proper heliostat spacing.

FIG. 10B depicts a foldable jig opened 1050 between two heliostat structures 1020,1021. The foldable jig uses a fixed heliostat structure 1020 to locate the position to install a heliostat structure 1021 in an adjacent column of the heliostat field. The fixed heliostat structure 1020 may be attached to the ground using stakes 308. Interface points 1040 may attach to locations on the post 204 of each heliostat structure. The heliostat structure to be installed 1021 may be moved until the heliostat structure interfaces with the interface points 1040 of the foldable jig at each post 204. Once the heliostat structure to be installed 1021 is in the correct position it may be fixed to the ground by using a stake 308, ballast, or other method. In a correct position, two interface points 1040 of the foldable jig are aligned and clamped onto two posts 204 of the heliostat structure to be installed 1021 and another interface point 1040 of the foldable jig 1040 is aligned with and clamped onto a post 204 of the fixed heliostat structure 1020.

Figure 10C:
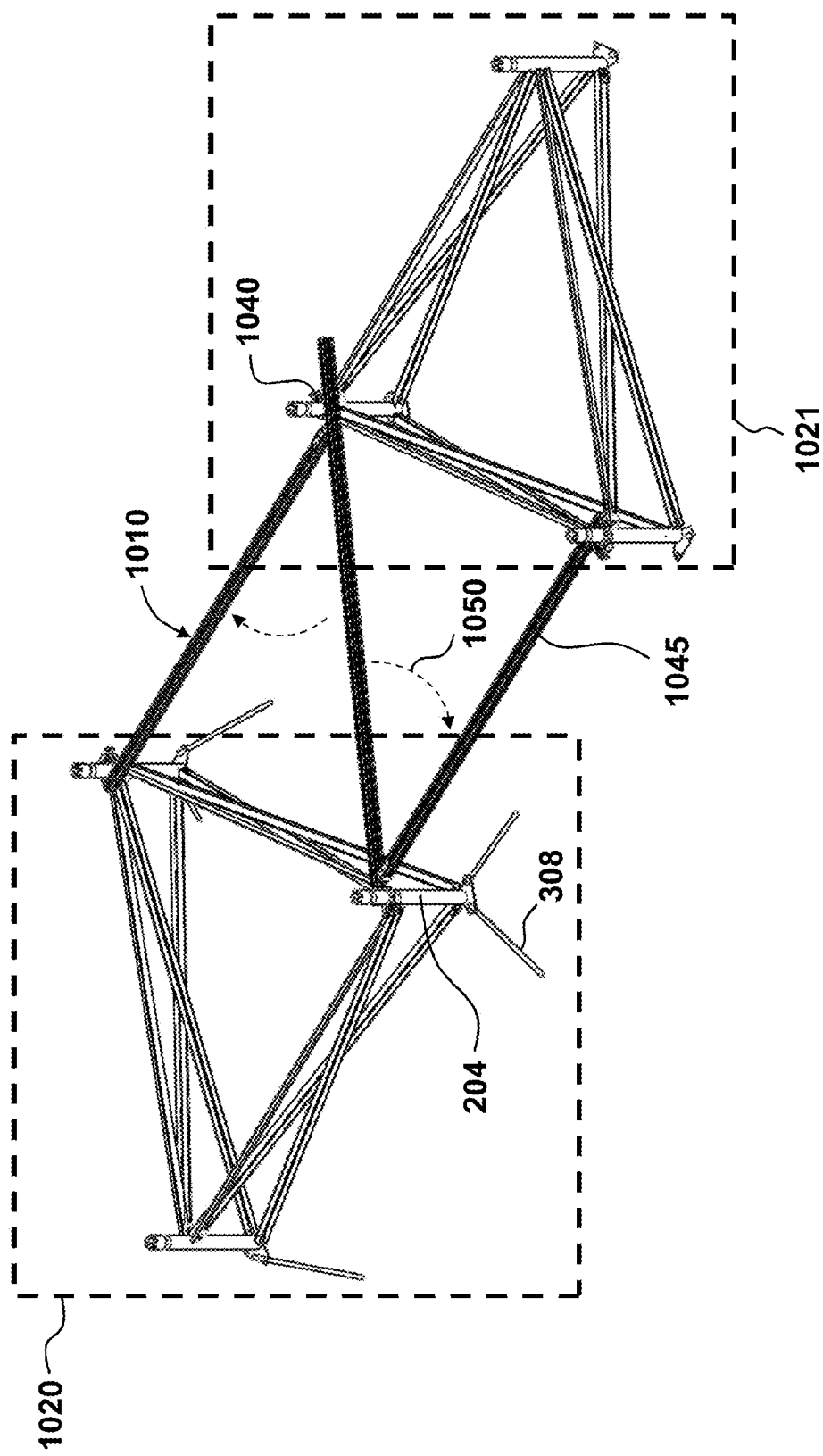
FIG. 10C depicts a fixed heliostat structure being used to position a heliostat in an adjacent row.

FIG. 10C depicts a foldable jig 1010 and direction to open 1050. The foldable jig 1010 uses a fixed heliostat structure 1020 to locate the position to install a heliostat structure 1021 in an adjacent row of the heliostat field. The fixed heliostat structure 1020 is attached to the ground using stakes 308. Interface points 1040 may attach to locations on the post 204 of each heliostat structure. The heliostat structure to be installed 1021 may be moved until it is in the correct position, i.e., two interface points 1040 of the foldable jig 1010 are aligned and clamped onto two posts 204 of the heliostat structure to be installed 1021 and two additional interface points 1040 of the foldable jig 1040 are aligned with and clamped onto two posts 204 of the fixed heliostat structure 1020. Once the heliostat structure to be installed 1021 is properly positioned, it may be fixed to the ground by using a stake 308, ballast, or other method.

Figure 10D:
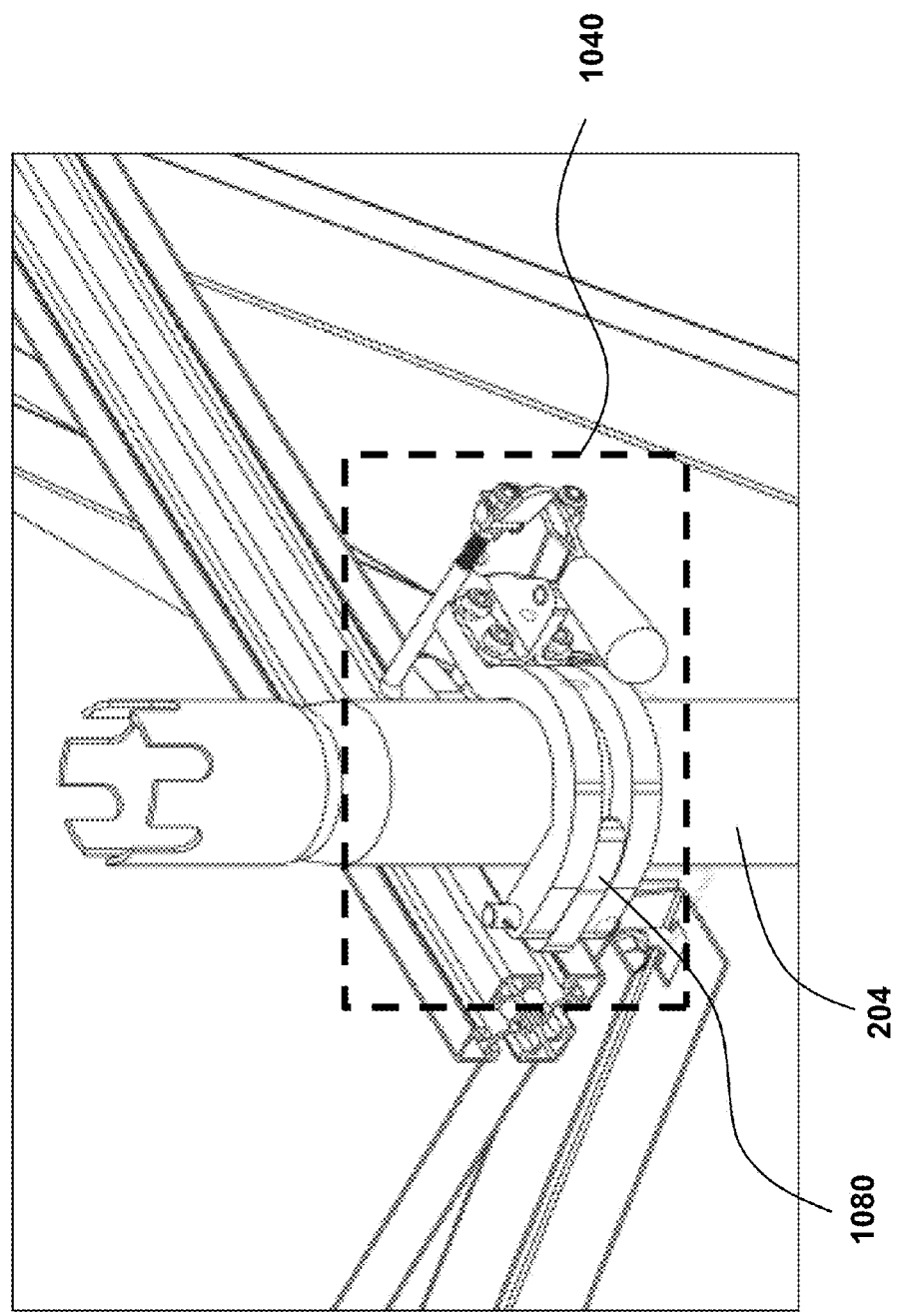
FIG. 10D depicts a clamp on a heliostat positioning jig used for positioning heliostat structures.

FIG. 10D shows the interface point 1040. It may comprise a clamp 1080 that may be placed over the post 204 and detachably attached to the post 204. In some embodiments, one or more fasteners may be pre-attached to the clamp 1080 so as to not require, or minimize, the need for additional tools during installation of the heliostat structures in the heliostat field.

It is contemplated that various combinations and/or subcombinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further it is intended that the scope of the present invention herein disclosed by way of examples should not be limited by the particular disclosed embodiments described above.

What is claimed is:

1. A heliostat structure comprising:
   three posts;
   three drive mounts, wherein each drive mount is located at an end portion of each of the three posts;
   three or more cross member sets wherein each cross member set comprises three cross members, wherein each cross member of the cross member set is connected between two posts out of the three posts to form a triangular configuration and wherein two cross members of a cross member set are connected between the two posts to form a triangular shape, and wherein two cross members of a cross member set intersect at a point between the two posts; and
   three heliostat drives, wherein each heliostat drive is configured to connect to a corresponding drive mount located on the end portion of each post of the three posts.

2. The heliostat structure of claim 1, wherein each post is equidistant from each other post, and wherein the three cross members form an equilateral triangle with the posts.

3. The heliostat structure of claim 2, wherein each cross member of the cross member set is interchangeable with each other cross member of the cross member set.

4. The heliostat structure of claim 1 further comprising two or more stakes, wherein the one or more stakes are disposed in the ground and attached to a proximate portion of one or more of the three posts.

5. The heliostat structure of claim 1, wherein the three heliostat drives are integral with the three posts.

6. The heliostat structure of claim 1, wherein the three heliostat drives are detachably attached to the three posts.

7. The heliostat structure of claim 1 further comprising a processor having addressable memory, wherein the processor is configured to: calibrate the position of the heliostat structure against a known surface based on three points of contact of the three heliostat posts to the ground.

8. The heliostat structure of claim 1 further comprising three heliostats, wherein the three heliostats are positioned on each of the three drive mounts, and wherein the arrangement of the three heliostats produces a hexagonal packing.

9. The heliostat structure of claim 8, wherein the heliostat density ranges from 20% to 50%.

10. The heliostat structure of claim 1, wherein the three drive mounts each comprise six or more slots, wherein the three heliostat drives comprise three or more fasteners, and wherein the six or more slots of the drive mounts are configured to receive the three or more fasteners of the heliostat drives so as to provide six orientations for mounting each heliostat drive in each drive mount.

11. The heliostat structure of claim 1, wherein each of the three drive mounts further comprises a tapered region, wherein the tapered region creates two separate contact regions between each drive mount and each connected heliostat drive.

12. The heliostat structure of claim 1 further comprising a wire, wherein the wire is configured to connect to an adjacent heliostat structure.

13. The heliostat structure of claim 12, wherein the wire is configured to provide a set spacing between the heliostat structure and an adjacent heliostat structure.

14. The heliostat structure of claim 1 further comprising a foldable jig, wherein the foldable jig further comprises two or more spacing bars and two or more interface points, wherein the one or more interface points are configured to detachably attach to at least two posts of the heliostat structure and at least two posts of an adjacent heliostat structure.

15. The heliostat structure of claim 14, wherein the foldable jig is configured to detachably attach to an adjacent heliostat structure in an adjacent row of heliostats.

16. The heliostat structure of claim 14, wherein the foldable jig is configured to detachably attach to an adjacent heliostat structure in an adjacent column of heliostats.

17. The heliostat structure of claim 14, wherein the one or more interface points are selected from at least one of: a pin and a clamp.

18. The heliostat structure of claim 1, wherein two cross members of each of the cross member sets are connected to a post of the two posts out of the three posts, at a single combined fastener.

19. The heliostat structure of claim 1, wherein two cross members of each of the cross member sets are connected by a fastener at a location along the length of the two cross members of the cross member set, wherein the location is at a point between the two posts where the two cross members intersect.

* * * * *